May 7, 1968   D. W. DAYTON   3,381,663
MINK NEST
Original Filed Feb. 7, 1966   3 Sheets-Sheet 1
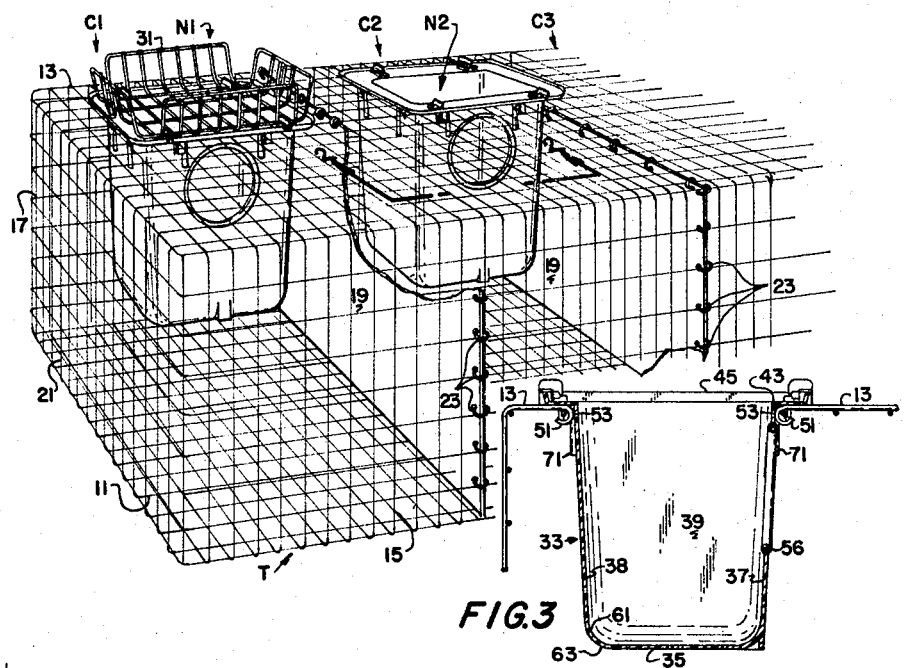
DONALD W. DAYTON
INVENTOR
BY
BUCKHORN, BLORE, KLARQUIST & SPARKMAN
ATTORNEYS May 7, 1968  D. W. DAYTON  3,381,663
MINK NEST
Original Filed Feb. 7, 1966  3 Sheets-Sheet 2
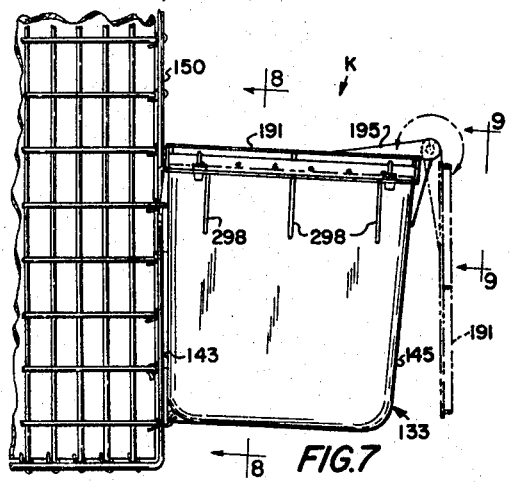
FIG.7
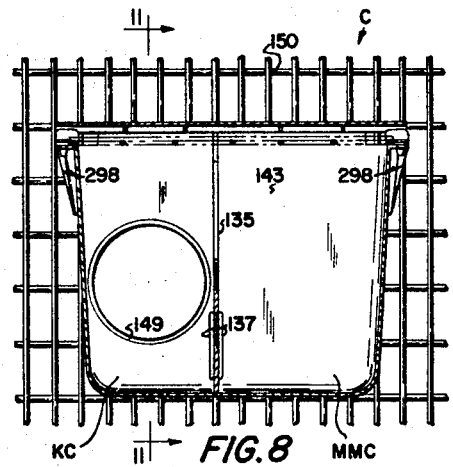
FIG.8
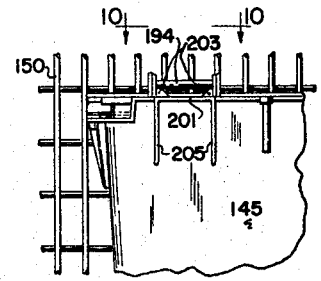
FIG.9
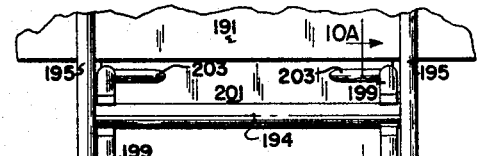
FIG.10
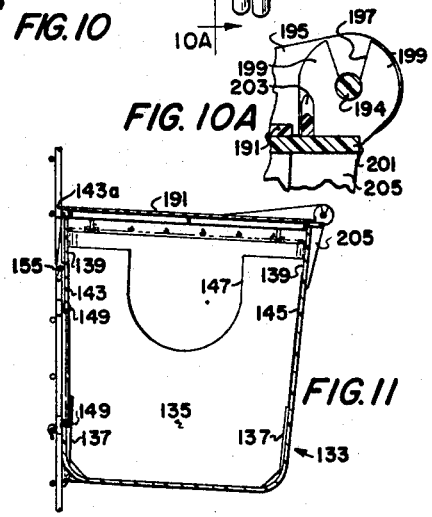
FIG.10A
FIG.11
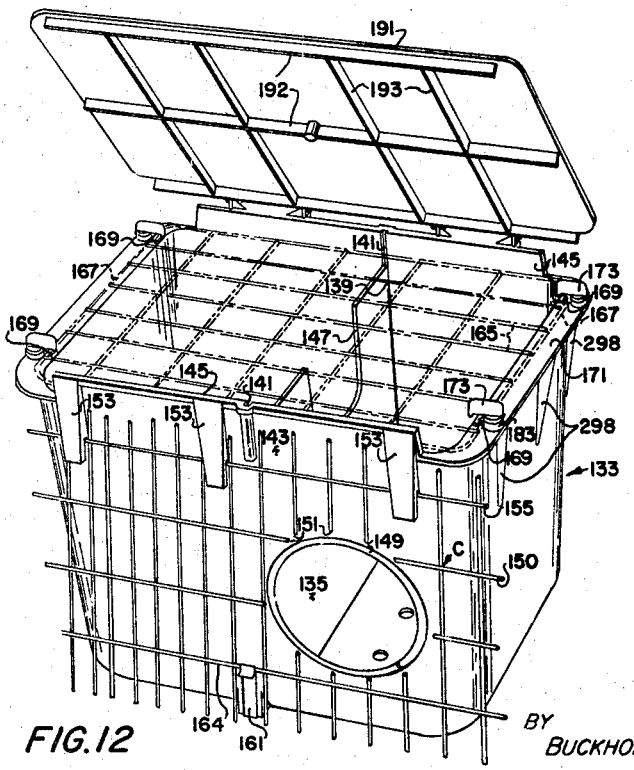
FIG.12
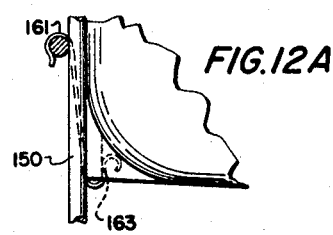
FIG.12A
DONALD W. DAYTON
INVENTOR
BY
BUCKHORN, BLORE, KLARQUIST & SPARKMAN
ATTORNEYS May 7, 1968   D. W. DAYTON   3,381,663
MINK NEST Original Filed Feb. 7, 1966   3 Sheets-Sheet 3

DONALD W. DAYTON
INVENTOR

BY
BUCKHORN, BLORE, KLARQUIST & SPARKMAN
ATTORNEYS

United States Patent Office 3,381,663
Patented May 7, 1968

3,381,663
MINK NEST
Donald W. Dayton, 2nd and B Sts.,
Gresham, Oreg. 97030
Continuation of application Ser. No. 525,441, Feb. 7, 1966.
This application Aug. 1, 1967, Ser. No. 657,709
9 Claims. (Cl. 119—15)

ABSTRACT OF THE DISCLOSURE

A mink nest adapted to be supported by a mink pen having side walls, a bottom wall and a removable top. One of the side walls having an animal access opening provided therein. The nest is made of plastic material with curved interior corners.

---

This is a continuation of application Ser. No. 525,441, filed Feb. 7, 1966, now abandoned.

This invention relates to housing units for animals and particularly for mink.

One problem in raising mink in captivity is keeping the fur of the animal in top grade condition.

Mink are conventionally raised in cages, and it is normal practice to provide in the cage a wooden box in which the mink may retire to sleep. However, the animal persists in performing normal body functions in the box and soon his fur becomes dirty and the color thereof may be harmed. I have also noted the box is difficult to clean. However, mink prefer sleeping in a concealed place, and hence the use of a box is very desirable. It is, of course, impossible to "housebreak" mink which are being raised in captivity, so the problems above enumerated have continued.

The box with its right angular inner and outer corners also presents another problem. When a mink defecates and urinates in its box, or even carries such material into its box, there is a tendency for such material to collect or remain in the interior box corners. Soon fungus growth occurs. The mink happens to like to chew on practically any available object and the right angle exterior box corners being of wood and of convenient "bite size" for the mink, it goes to work on such corners. Many times it will chew through the corners and digest some of the fungus. While there may be no firm proof, it is believed that such digestion may be the cause of, or a contributing factor to, illness in mink, and particularly the illness called "Aleutians" disease. This is contagious and may wipe out a sizeable number or maybe all of the mink of a mink raiser.

I have noted that a mink, when defecating or urinating, assumes a position with its body longitudinally oriented and its tail curled upwardly. I have discovered that, in fact, a mink cannot defecate or urinate unless he assumes such position. I have also noted that the "diameter" or overall width of the animal in its curled up generally circular sleeping position is substantially less than its length when in its defecating or urinating position.

A main object of my invention is to provide for mink a nest designed so that it can be dropped into an opening in a wire cage and readily and securely detachably fastened in place, and wherein the nest is so dimensioned, in the horizontal plane, that while the mink can readily enter and exit, and while there is room for the mink to curl up for sleep, there is insufficient room for the mink to assume its defecating or urinating position. Therefore, the mink must defecate and urinate outside the nest with the result that the nest is maintained relatively clean.

Another object of the invention is to provide a kit nest which can be hung on the front of a wire cage and has an access opening in register with an opening in the wire cage to facilitate ready access to the nest by the mother mink.

Another object of the invention is to provide a mink nest constructed so that it may be employed in drop-in fashion or hung on a vertical section of the cage at the option of the user.

Another object of the invention is to provide a mink nest having a stackable member formed of a high impact and temperature resistant plastic.

Further objects of the invention are to provide a mink nest having rounded or curved interior and exterior corners so that the problems above mentioned and attributable to right angled corners are cured; to provide a mink nest having a simple means for detachably securing it in place and on wire cages of differing mesh sizes; to provide a mink nest on which a nest material basket can be readily detachably mounted; to provide a kit nest having a foraminous top closure and a solid top closure optionally movable from an open to a closed position without disturbing the foraminous closure.

Various other objects will be apparent when taken in connection with the accompanying drawings, wherein:

FIG. 1 is a perspective view of part of a row of mink cages, two of which cages are equipped with drop-in nests of my invention;

FIG. 2 is a vertical sectional view taken along line 2—2 of FIG. 1, on a larger scale;

FIG. 3 is a vertical sectional view taken along line 3—3 of FIG. 2;

FIG. 4 is a plan view taken in the direction of arrows 4—4 of FIG. 2;

FIG. 4A is an enlarged view of the basket latch;

FIG. 5 is a horizontal sectional view taken along line 5—5 of FIG. 2, but in addition showing a mink in curled-up sleeping position;

FIG. 6 is an enlarged vertical sectional view taken along line 6—6 of FIG. 2;

FIG. 7 is a view of my kit nest shown mounted on the front of a wire cage, with the cover in full lines in closed position and in phantom lines in open position;

FIG. 8 is generally a vertical sectional view of the kit nest taken along line 8—8 of FIG. 7;

FIG. 9 is a fragmentary elevational view taken in the direction of the arrows 9—9 of FIG. 7;

FIG. 10 is a fragmentary plan view on an enlarged scale taken in the direction of the arrows 10—10 of FIG. 9;

FIG. 10A is a fragmentary vertical section taken along line 10A—10A of FIG. 10;

FIG. 11 is a vertical sectional view taken along line 11—11 of FIG. 8;

FIG. 12 is a perspective view of the kit nest, showing the cover partially raised and showing a fragment of the front cage section;

FIG. 12A is an enlarged fragmentary view of the bottom securing means of the kit nest;

Figure 13:
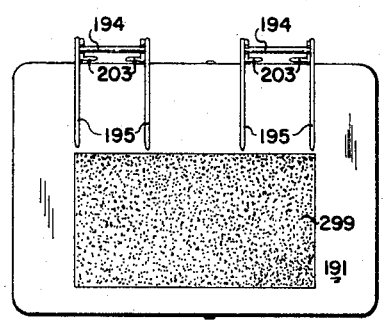
FIG. 13 is a plan view of the kit nest showing the cover closed.

Mink are usually kept in rows of rectangular wire cages, the cages at one end of a row of cages being shown in FIG. 1. The endmost cage is labeled C1, the next cage C2, and the next cage, a part only of which is shown is labeled C3. The cages are located under a shed (not shown) of some sort to keep rain off the cages.

A row of wire cages is conventionally formed by providing a wire tunnel of rectangular cross section divided up into separate cages by solid or foraminous (wire) panels. The wire cages may be provided in other ways, but this is immaterial to the present invention. The row of cages shown is of the panel-divided type.

While the wire making up the wire tunnel T is bent at the corners to continue the shape of the tunnel, and while the wire extends uninterruptedly from one cage to the next, it is more convenient to speak of the walls of the cage as being sections. Each cage has bottom and top sections 11 and 13, respectively, and front and rear sections 15 and 17, respectively. The opposite side sections of the intermediate cages of a row are provided by solid panels 19 of plywood or artificial board, while the endmost cages have one wire side section 21, as shown in the case of cage C1 in FIG. 1. The panels 19 have marginal holes formed therein facilitating their being fastened in place by wire ties 23.

Two of my drop-in mink nests are shown in FIG. 1, one labeled N1 for cage C1 and the second, labeled N2 for cage C2. The nests are of identical construction but nest N1 is shown in FIG. 1 having a wire basket 31, whereas the basket for N2 is removed for convenience in illustration. The construction of nest N2 will be explained, with reference to the basket of nest N1 being made only as is necessary to an understanding of the construction of my nest.

My drop-in nest is primarily a two-piece unit, comprising a basket 31 and a nest housing 33 which is in the form of an open top, deeply cupped member which is of a high impact, high heat range plastic material such as polystyrene. While more expensive plastic materials (such as nylons, butyls, etc.) may be used, polystyrene is the least expensive. Because of its wide range of heat tolerance, the housing will not shatter at subzero temperatures encountered in cold climates and will not deform and lose its shape when subjected to steam cleaning operations.

The nest housing is generally square in horizontal cross section, as is evident from FIGS. 4 and 5, and includes a bottom wall 35, and four outwardly tapering walls 37, 38, 39 and 40, walls 37 and 38 being considered as the front and back walls, respectively, and 39 and 40 the side walls. At its upper end the nest housing has an outwardly extending peripheral flange 43 which terminates in an upwardly and outwardly flaring lip 45.

The top wire section 13 of cage C2 has a square opening cut therein of a size less than that of the nest housing 33, and the margins 51 of the wire section which define the opening are bent downwardly and outwardly as shown in FIG. 3 to leave an opening 53 which snugly and frictionally engages the nest housing 33 at places therearound and just below the flange 43, and to frictionally retain the nest in place. The flange 43 acts as a support means for the nest housing and rests against the portions of the top wire section 13 of the cage C2 which surrounds the opening 53.

The underside of the flange 43 near the top of front wall 37 and the rear wall 38 is equipped with depending retainers 55 (FIGS. 6 and 2) which are flexible and have inwardly enlarged head portions 57 to snap under the associated wires (such as wire 59 in FIGS. 2, 4 and 6) of the cage top section 13 to detachably retain the drop-in nest in place.

It is pointed out that common wire meshes used for mink cages are 1″ by 1″, 1″ by 1½″, and 1″ by 2″. The retainers 55 near the front wall 37 are located a little over eight inches from the retainers near the rear wall 38 so that they will properly engage all of the above meshes, except only when the 1″ by 1½″ mesh is disposed with its rectangular openings running from front to back of the cage. Even so, one set of retainers will properly engage one wire. The frictional fit of the nest in the top cage section and the fact that the housing, because of its form, cannot be tilted upwardly more than a few degrees, even when only one set of retainers are in securing position, means that the nest will be securely held in place without danger of escape of the mink.

Front wall 37 of the nest housing 33 is formed with an opening, the edges of which are covered by a metal ring 56 which prevents tearing of the mink's fur on such edges. The access opening defined by the ring 56 is located above the bottom wall 35 a substantial distance, at least greater than the thickness of the body of the mink, to leave a five sided compartment in the lower portion of the nest, in which the mink can hide itself when desiring to sleep.

The bottom wall 35 of the nest has plural perforations 57 formed therein to enable the nest to be readily washed out and to drain the nest in the event water condenses on the interior walls thereof and runs down into the bottom of the nest.

Referring to FIGS. 3, 4 and 5, it is evident that the interior and exterior corners of the housing 33 are distinctly curved as indicated by the reference numeral 61 in FIG. 5 for the interior corners and the reference numeral 63 for the exterior corners. Also, the bottom corners are curved as evident from FIG. 3. This curvature assures against the accumulation in the corners of excrement and other organic matter that might be carried into the nest by the mink, and thus distinctly lessens the likelihood of fungus growth in the nest.

The housings 33 of my nests are readily stackable in nesting relationship one with the other. I provide ribs 71 on the exterior of the housing beneath the flange 43 to limit the nesting relationship to a condition just short of full mating contact. If the latter were allowed to occur, the housings might tend to bind one within the other and hence make separation difficult.

The basket 31 serves as a foraminous cover for the housing 33 to prevent escape of the mink. The basket is releasably retained in place by latch members 73 which are probably best shown in FIGS. 4, 4A and 6. Each latch member comprises a mounting portion including a head 75 (FIG. 4A) and a shank 77 (FIG. 6) terminating in a locking portion 79 which is made compressible by a conical bore 81. The shank 77 and locking portion 79 are pressed downwardly into a hollow boss 83 provided on the edge of the housing flange 43. The interior of the boss 83 is counterbored to provide a shoulder 85 which locks the latch member in place but does not interfere with turning movement of such latch member.

The latch member includes a finger-engaging upstanding rib 87 (FIGS. 4A and 6) medially secured to and preferably integral with the head 75. Rib 87 projects inwardly and has a depending retaining dog 89 which snaps over an end wire 91 of the basket 31 to retain the basket in place.

A pair of lugs 93 (FIGS. 4A and 6) are provided on the flange 43 in association with each latch member 73 and flank the rib 87 (in the locking position of the latch members 73) as is evident from FIG. 4A. The lugs 93 terminate at a level just beneath that of the bottom surface of the dog 89 and are recessed at 95 to accommodate the wire 91.

The reason the foraminous closure member 31 is in the form of a basket is so that it can contain shredded or stringy nesting material (not shown) to which the mink can gain access through the mesh openings of the basket. The mink will pull in sufficient of such nesting material to enable it to form the nest it desires.

The housing 33 is so dimensioned that while a mink can readily enter and exit the housing, and while there is sufficient room for the mink to curl up for sleep, there is insufficient room for the mink to assume its defecating or urinating position. Thus, the mink cannot perform these functions in the nest, which therefore remains relatively clean.

Kit nest

FIGS. 7-16 show a kit nest K having a housing 133 which is much like the drop-in housing 33 except that the kit nest K is elongate and divided by a partition 135 (FIGS. 8, 11 and 12) to separate the housing into two compartments, a kit compartment KC and a mother mink compartment MMC. The bottom portion of the partition is held in place by a pair of ribs 137 (FIGS. 8 and 11) provided on each of the front and rear walls of the housing 133. The top portion of the partition is held in place by having wing pieces 139 (FIG. 2) fitting in opposed grooves 141 provided in the rear wall 143 and front wall 145 of the housing 133, respectively.

A notch 147 (FIGS. 11 and 12) or hole is provided in the partition 135 at a level above the ribs 137 to allow the mother mink to move from one compartment to the other, but the remainder of the partition precludes such access to the small kits. Since I have found that mink raisers or ranchers differ as to where the notch or hole is to be located, I may provide a blank partition and allow the mink raiser or rancher to provide his own notch or hole. Since the walls 143 and 145 taper inwardly toward the bottom of the housing 133, the side edges of the partition 135 are also tapered accordingly.

There is an access hole into the mother mink compartment MMC which is provided in the rear wall 143 of the housing 133 as best shown in FIGS. 8, 11 and 12, the hole being a metal ring type grommet 149 which prevents tearing the minks' fur.

The front section 150 of the associated cage C has a hole 151 formed therein with which the access hole 149 registers. The housing 133 is held in such a registering position by downwardly oriented hooks 153 molded as interal portions of the rear wall 143 and hooking over a wire 155 of such front cage section. In fact, I contemplate that the hole 151 will be formed after the mounted position of the housing 133 on the front cage section 150 has been determined, because, with different meshes of cage wire, it would be awkward and perhaps impractical to provide the hole 151 and hope that the hooks 153 would suspend the kit nest in a position with its access hole in register with hole 151.

The rear wall 143 of the housing 133 is also secured at its lower end to the cage C by a metal or plastic S-clip 161 (FIGS. 12 and 12A) which hooks under the rear wall 163 portion of a well formed medially along the lower margin of the rear wall 143. It is contemplated that the S clip will initially have one bent end and one plain end, and, after the bent end is fitted on the well wall 163, the plain end will be bent to properly engage the cross wire which is above and closest to the well wall 163. This cross wire happens to be wire 164 in FIG. 12.

I find that in most instances the kit nest is stably and firmly supported on the front wire section without use of the clip 161, because the top rear edge 143a (FIG. 11) of the rear wall prevents the nest K from pivoting about wire 155 in a counterclockwise direction in FIG. 11.

The kit nest K has a foraminous closure member 165, which is shown in phantom lines in FIG. 12 for convenience in illustration and which has a mesh such that the end wires 167 thereof will fit behind lugs 169 (FIGS. 12 and 16) provided on end flanges 171 of the housing 133. These wires will be locked between such lugs and latch members 173 which are like latch members 73 previously described and which are similarly mounted in place on hollow bosses 183.

It is evident from FIGS. 12 and 16 that the flanges 171 are located at a level below that of the upper edges of the rear wall 143 and the front wall 145. The reason for this will be evident presently.

The kit nest K has a solid cover 191 comprising a solid plate reinformed by longitudinal ribs 192 and cross ribs 193. The cover 191 has a pair of hinge pins 194 (FIGS. 13, 9 and 10) each formed as an integral part of a pair of ribs 195 (FIGS. 7 and 10). The ribs are in turn integral with the body of cover 191.

Each pin 194 has a snap fit down through slots 197 (FIG. 10A) provided in a pair of ears 199 which are integral with and project upwardly from a flange 201 (compare FIGS. 10, 10A and 9). A pair of gussets 203 (FIGS. 9 and 10) reinforce the ears 199 on the flange 201 and a pair of gussets 205 reinforce the flange on the front wall 145 of the nest housing 133.

When the weather is fine, the cover 191 may be swung to its open position as shown in phantom lines in FIG. 7. When the weather is not so good and perhaps colder, the cover 191 will be closed to keep out the elements (wind and driving rain). However, even when the cover 191 is in its closed position, cross ventilation air spaces are still provided between the cover and the flanges 171, as shown in FIGS. 7 and 11, because of the dropped position of the flanges.

Figure 14:
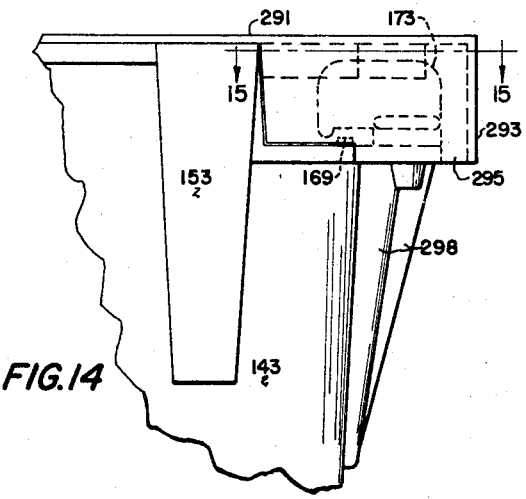
FIG. 14 is an enlarged fragmentary front view of a modified form of my kit nest showing the cover equipped with cold weather flaps.
Figure 16:
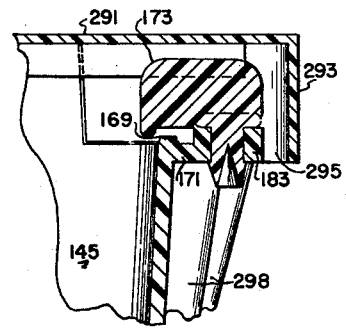
FIG. 16 is a vertical sectional view taken along line 16—16 of FIG. 15.
Figure 15:
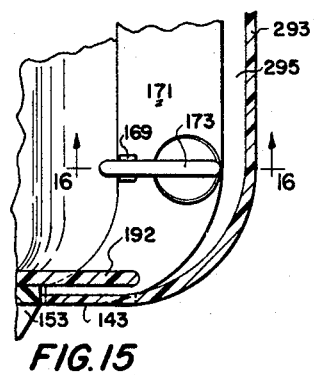
FIG. 15 is a horizontal section taken along line 15—15 of FIG. 14.

In the midwest cold weather states, where subzero temperatures are not unusual, I prefer to use a cover 291 like that in FIGS. 14-16. This cover is identical to cover 191 except that it is slightly longer and has depending cold weather end flaps (flanges) 293 which close off the cross ventilation through passages provided by the dropped position of the flanges 171. However, as shown in FIGS. 15 and 16, each end flap 293 is disposed outwardly of the associated flange 171 to leave a small space 295 through which air can pass and provide more limited cross ventilation.

No cover is required for the drop-in nest because the grown mink does not require any more protection from the cold than is afforded by the housing itself, which in any event is usually somewhat covered by the nesting material (not shown) which will be supplied in the basket 31.

The size of the compartments KC and MMC of my kit nest are both such that the mother mink does not have room therein to assume a defecating or urinating position, and the interior and exterior corners of the nest housing 133 are curved to avoid the difficulties referred to hereinbefore.

The kit nest is provided with suitable ribs 298 therearound for reinforcement and to prevent complete nesting of kit nest housings 133 (and hence prevent a binding fit of one housing within the other).

I provide a sanded surface area 299 (FIG. 13) on the cover 191 to facilitate the noting of pertinent information on the cover.

Figure 17:
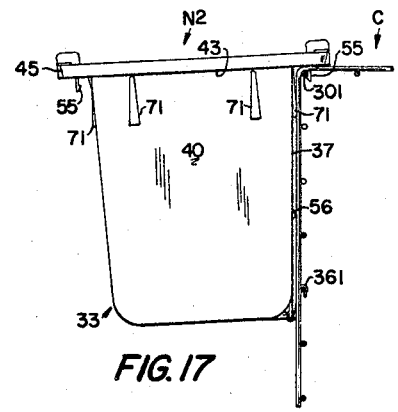
FIG. 17 shows the drop-in nest mounted on the front of a mink cage.

FIG. 17 shows that my drop-in nest N2 may be mounted on the front section of a cage C by disposing the flange 43 thereof so that it rests on the top section of the cage and latching the housing 33 onto the top cross wire 301 of the front section of the wire cage C by means of the pair of retainers 55 associated with the front wall 37 of the housing 33. The bottom of the housing 33 would be retained against outward swinging movement by an S clip 361 as shown in FIG. 17. A hole (not shown) would be cut in the front section of the cage C in register with the access hole of the housing 33. A basket (not shown) would provide a foraminous cover for the housing 33.

By forming my nest housings of a high impact and temperature resistant plastic, I gain the obvious advantages inherent in such plastic, and also provide a housing having good insulating qualities, and without cracks as are present in wooden boxes.

Having described the invention in what is considered to be the preferred embodiment thereof, it is desired that it be understood that the invention is not to be limited other than by the provisions of the following claims.

I claim:
1. A mink nest for application to a wire cage comprising:
    a housing member having a bottom wall and upright front, back and side walls, said housing having an open top providing for cleaning access to the interior thereof, one of the upright walls having an animal access opening therein for movement of a mink into and out of said housing, retainer means on the housing for engaging and detachably mounting said housing to the wires of the wire cage with at least the top thereof exposed exteriorly of the cage, and with said animal access opening communicating with the interior of said cage, said housing being formed of a high impact and temperature resistant plastic material, the interior corners of the housing being distinctly curved to prevent the accumulation therein of organic material, a foraminous cover for the top of said housing, latch means carried by said housing for detachably engaging said foraminous cover and detachably retaining it in place.

2. A mink nest as set forth in claim 1, in which said latch means are so located as to be exposed at the exterior of said wire cage.

3. A mink nest as set forth in claim 1, wherein said latch means compirse snap hook means carried by said housing at the periphery thereof for snapping over portions of said foraminous cover and detachably retaining it in place.

4. A mink nest as set forth in claim 1, wherein the dimensions of said housing in a horizontal plane just above the bottom wall thereof are sufficient to enable a mink to assume a curled position only therein and preclude its assuming a position for defecating or urinating wherein its body must be longitudinally oriented.

5. A mink nest as set forth in claim 1, said housing having an outwardly projecting flange on its upper end for resting on the top section of the wire cage in either of two positions, one wherein the housing is arranged in drop-in fashion in spaced relation inwardly of the margins of said top section, and the other wherein the housing is arranged against the front section of the wire cage with said flange resting on a margin of the top section of said cage, and means for detachably engaging at least one wire of the top section of said cage for retaining said housing in place.

6. A mink nest as set forth in claim 1, said housing having a foraminous cover for the top thereof and a solid cover for said top, and means mounting both covers on said housing with said solid cover being above said foraminous cover and movable to and from an open position on said housing, said mounting means including means for separately holding said foraminous cover in place, said mounting means further including raised portions of certain opposed walls only of said housing and means on the upper end of at least one such wall for mounting said solid cover in place for movement to and from a superposed relation with respect to said foraminous cover, the remaining walls of said housing terminating short of the upper ends of said certain opposed walls whereby air spaces are provided for the travel of air in limited fashion into and out of said housing even though said solid cover is in its operative closed position above said foraminous cover.

7. A mink nest as set forth in claim 1, wherein there is an outwardly projecting marginal flange around the upper end of said housing for resting on the top of a wire case with the nest arranged in drop-in relation in a hole in the cage, and said retainer means include snap hook means on the underside of said flange for snapping onto wires of said cage for detachably retaining said mink nest in place.

8. A mink nest as set forth in claim 7, at least certain of the said hooks being defined in part by one of the upright walls of the housing.

9. A mink nest as set forth in claim 8, said housing having a wall portion extending upwardly from at least certain of said hooks for bearing against a vertical section of said cage and preventing outward pivoting movement of said housing on said cage.

References Cited

UNITED STATES PATENTS

| | | | |
|---|---|---|---|
| 2,002,259 | 5/1935 | Cole | 119—19 |
| 2,275,914 | 3/1942 | Lorenz | 119—45 |
| 2,655,129 | 10/1953 | Miller | 119—17 |
| 3,035,544 | 5/1962 | Katt | 119—19 |
| 3,037,480 | 6/1962 | De Silva | 119—45 |
| 3,122,127 | 2/1964 | Schechmeister et al. | 119—18 |
| 3,227,139 | 1/1966 | Gass et al. | 119—17 |

HUGH R. CHAMBLEE, *Primary Examiner.*